United States Patent
Liu et al.

(10) Patent No.: US 12,494,041 B2
(45) Date of Patent: Dec. 9, 2025

(54) SPECIALIZED, DATA-FREE MODEL QUANTIZATION

(71) Applicant: Cisco Technology, Inc., San Jose, CA (US)

(72) Inventors: Gaowen Liu, Austin, TX (US); Ramana Rao V. R. Kompella, Foster City, CA (US); Hugo Latapie, Long Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 309 days.

(21) Appl. No.: 18/231,466

(22) Filed: Aug. 8, 2023

(65) Prior Publication Data
US 2025/0054276 A1    Feb. 13, 2025

(51) Int. Cl.
G06V 10/764    (2022.01)
G06V 10/70    (2022.01)

(52) U.S. Cl.
CPC ............ *G06V 10/764* (2022.01); *G06V 10/87* (2022.01)

(58) Field of Classification Search
CPC .............................. G06V 10/764; G06V 10/87
See application file for complete search history.

(56) References Cited

U.S. PATENT DOCUMENTS

2020/0364552 A1    11/2020 Guo
2021/0089922 A1    3/2021 Lu et al.
2021/0125066 A1*   4/2021 Lazovich ............... G06N 20/10
2021/0201157 A1    7/2021 Jiang et al.
2021/0232890 A1    7/2021 Li et al.
2022/0138529 A1    5/2022 Kim
2023/0267766 A1*   8/2023 Nguyen ................. G06V 20/52
                                                382/157

FOREIGN PATENT DOCUMENTS

WO    2021102125    5/2021

OTHER PUBLICATIONS

"Post-training quantization", online: https://www.tensorflow.org/lite/performance/post_training_quantization, accessed Aug. 8, 2023, 8 pages.
Ku, et al., "A Selective Survey on Versatile Knowledge Distillation Paradigm for Neural Network Models", arXiv:2011.14554v1 [cs.LG] Nov. 30, 2020, 15 pages.

* cited by examiner

*Primary Examiner* — David F Dunphy
(74) *Attorney, Agent, or Firm* — Lee & Hayes, P.C.

(57) ABSTRACT

In one implementation, a device obtains a base machine learning model trained to label input data using a plurality of classes. The device receives a deployment task from a user interface indicative of a subset of one or more of the plurality of classes to be identified by a new model for deployment. The device selects a quantization level based on a difficulty associated with the deployment task. The device generates the new model for deployment that is quantized from the base machine learning model and specialized to label its input data using only the subset of one or more of the plurality of classes.

20 Claims, 7 Drawing Sheets

SPECIALIZED, DATA-FREE MODEL QUANTIZATION

TECHNICAL FIELD

The present disclosure relates generally to computer networks, and, more particularly, to specialized, data-free model quantization.

BACKGROUND

Neural networks and other forms of machine learning models have proven to be quite capable of performing a large variety of tasks. For instance, machine learning is increasingly being used in the field of video analytics for purposes of tasks such as object detection, object or behavior classification, and the like. Doing so has a wide variety of use cases ranging from medical imaging to surveillance systems, among others.

One tradeoff to the use of machine learning is that many models can be computationally-intensive, making their training and execution unsuitable for certain devices. Indeed, the more capable the model, the more resources that it consumes during its training, as well as its execution. For instance, training a model to detect hundreds of different types of objects or behaviors will result in a model that is much larger and resource consuming than one that is only trained to detect a dozen different types of objects or behaviors. Depending on the deployment use case, though, a more capable model may be overkill for its intended use, thereby consuming additional resources, unnecessarily.

Moreover, different users may care about different classes in different scenarios. Training data for a given deep learning network may also be unavailable due to various issues (e.g., privacy, legal requirements, transmission, etc.). Different types of hardware also support different numbers of bits. Further, models are often sensitive to different types of classes. For instance, to achieve the same accuracy, 8-bit networks for one class may be needed vs. 4-bit networks for another class.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device obtains a base machine learning model trained to label input data using a plurality of classes. The device receives a deployment task from a user interface indicative of a subset of one or more of the plurality of classes to be identified by a new model for deployment. The device selects a quantization level based on a difficulty associated with the deployment task. The device generates the new model for deployment that is quantized from the base machine learning model and specialized to label its input data using only the subset of one or more of the plurality of classes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
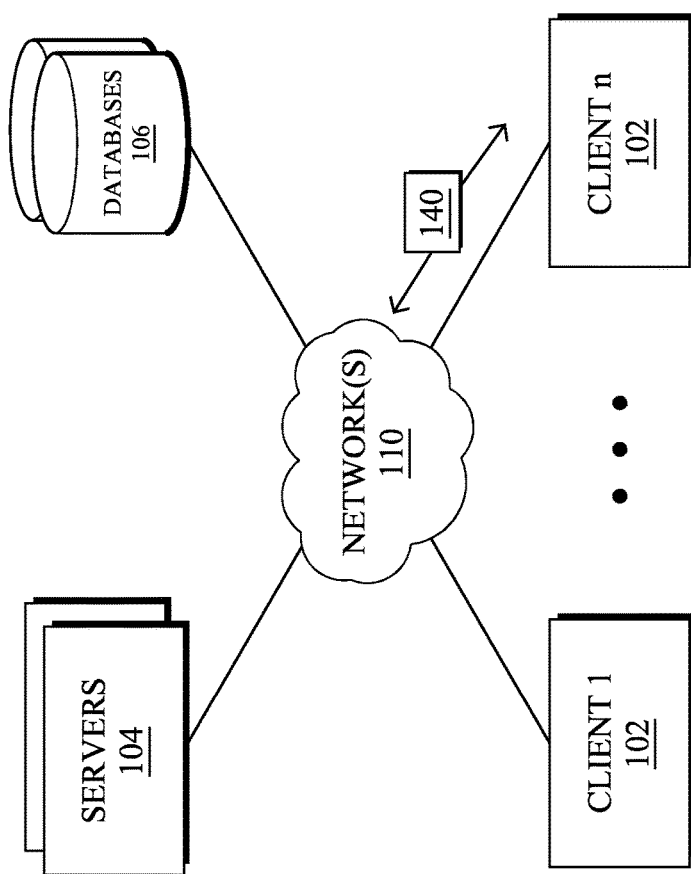
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
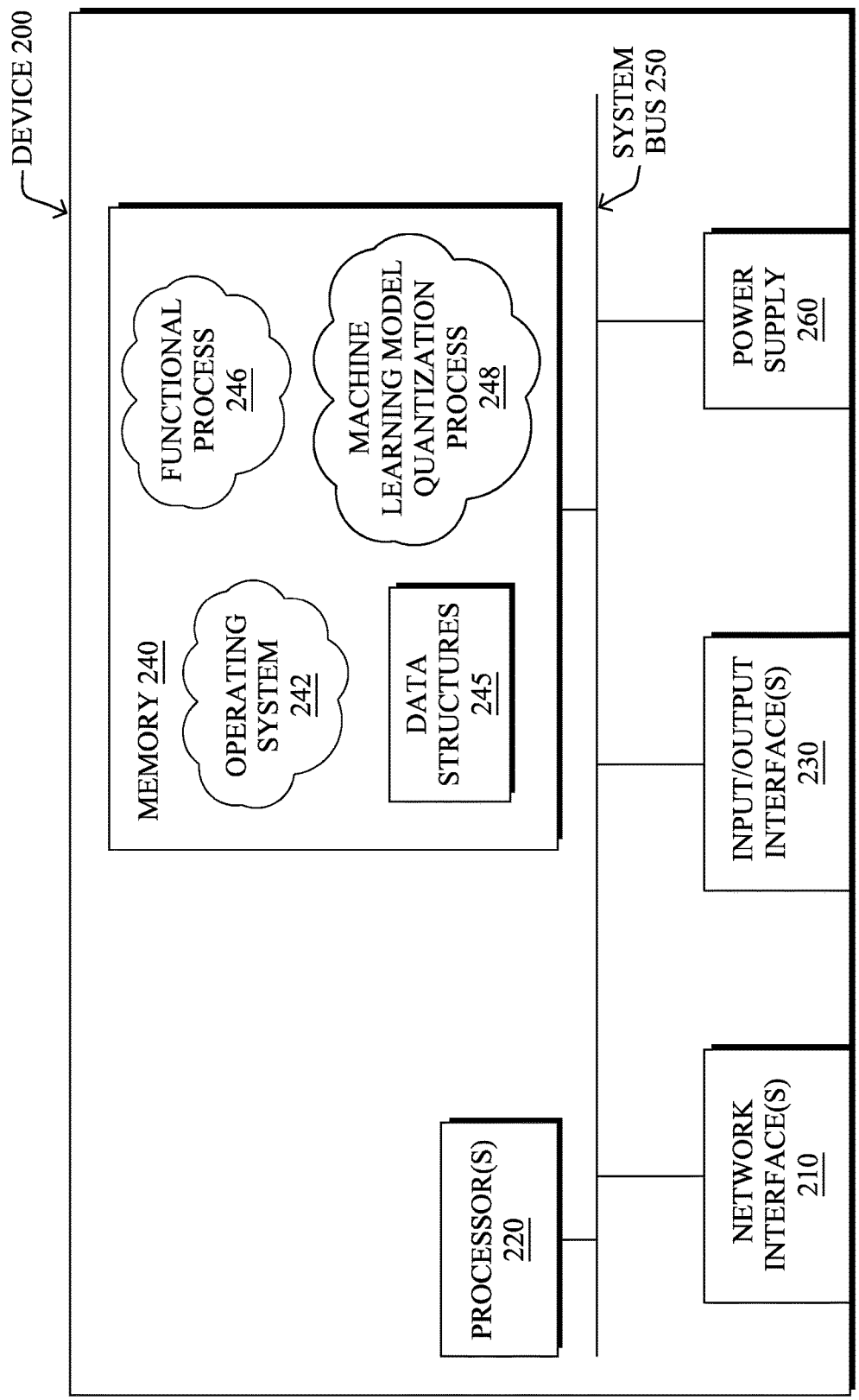
FIG. 2 illustrates an example computing device/node.

FIG. 2 is a schematic block diagram of an example node/device 200 (e.g., an apparatus) that may be used with one or more implementations described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "machine learning model quantization" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

In various implementations, as detailed further below, machine learning model quantization process 248 may include computer executable instructions that, when executed by processor(s) 220, cause device 200 to perform the techniques described herein. To do so, in some implementations, network control process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, machine learning model quantization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that machine learning model quantization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, large language models (LLMs), or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As would be appreciated, a key challenge that may arise in machine learning environments is finding a balance between the size of the machine learning model and the desired accuracy of the machine learning model. For example, the more accurate or "capable" the machine learning model, the more resources (e.g., computing resources) used in training the machine learning model. As discussed in more detail herein, a highly capable machine learning model may not always be necessary depending on the task given to the machine learning model, the hardware executing the machine learning model, and/or the accuracy desired of the machine learning model, among others. Accordingly, the present disclosure allows for the generation of specialized compressed machine learning models through the use of quantization in an automated and optimized manner.

As mentioned above, neural networks and other machine learning models have proven to be capable of performing a large variety of tasks. For example, machine learning is increasingly being used in the field of video analytics for purposes of object detection, object classification, and/or behavior classification, etc. These and other tasks that may be performed using machine learning techniques have a wide variety of use cases ranging from medical imaging to surveillance systems, among others.

One tradeoff to the use of machine learning is that many models can be computationally intensive, which can make their training and execution unsuitable for certain devices. Indeed, the more accurate or "capable" the model, the more resources (e.g., computing resources, such as processing resources, memory resources, bandwidth, etc.) that it consumes during its training, as well as its execution. For instance, training a model to detect hundreds of different types of objects or behaviors can result in a model that is much larger and resource consuming than one that is only trained to detect a dozen different types of objects or behaviors. While highly capable models have found use in certain deployment use cases, for other deployment use cases, a more capable model may be overkill for its intended use, thereby consuming a larger amount of resources than necessary.

Further, different users may care about different classes in different scenarios. Training data for a given deep learning network may also be unavailable due to various issues (e.g., privacy, legal requirements, transmission, etc.). In addition, different types of hardware also support different numbers of bits. Moreover, machine learning models are often sensitive to different types of classes. For instance, to achieve a same accuracy (or precision), 8-bit networks for one class may be needed while 4-bit networks may suffice for another class.

Specialized, Data-Free Model Quantization

The techniques introduced herein allow for a framework to produce specialized compressed machine learning models. More specifically, the techniques herein provide for production of compressed machine learning models through the use of quantization in an automated and optimized manner. For example, as described in more detail, herein, a s system is disclosed that allows a user to automate various considerations that are associated with generating a machine learning model in a manner that satisfies requirements of a targeted deployment use case for the machine learning model.

Illustratively, the techniques described herein may be performed by hardware, software, and/or firmware, such as in accordance with machine learning model quantization process 248, which may include computer executable instructions executed by the processor 220 (or independent processor of interfaces 210) to perform functions relating to the techniques described herein.

Specifically, according to various implementations, a device obtains a base machine learning model trained to label input data using a plurality of classes. The device receives a deployment task from a user interface indicative of a subset of one or more of the plurality of classes to be identified by a new model for deployment. The device selects a quantization level based on a difficulty associated with the deployment task. The device generates the new model for deployment that is quantized from the base machine learning model and specialized to label its input data using only the subset of one or more of the plurality of classes.

Figure 3:
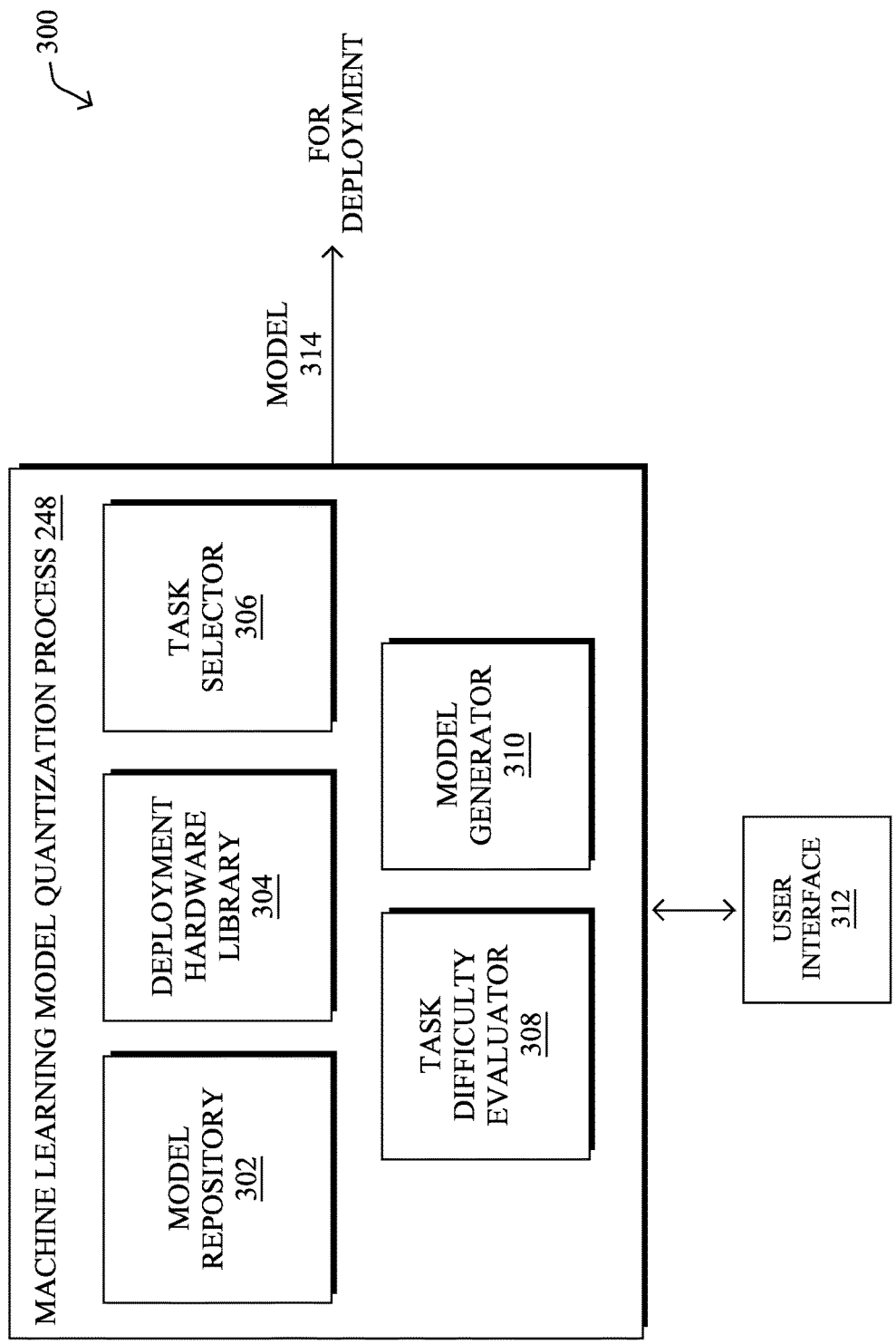
FIG. 3 illustrates an example architecture for machine learning model quantization.

Operationally, FIG. 3 illustrates an example architecture 300 for machine learning model quantization. As shown in FIG. 3, the architecture 300 includes various components that are configured to perform a machine learning model quantization process 248. For example, the machine learning model quantization process 248 can be performed using a model repository 302, a deployment hardware library 304, a task selector 306, a task difficulty evaluator 308, and/or a model generator 310. While these components are shown separately, further implementations provide for their functionalities to be combined and/or omitted, as desired.

The model repository 302 can be a store (e.g., datastore, memory device, etc.) that configured to store one or more general models (e.g., the model 510 of FIG. 5) that can be used to perform specialized, data-free model quantization in accordance with the disclosure. The deployment hardware library 304 can be configured to store information corresponding to various types of hardware (e.g., central processing unit(s), graphics processing unit(s), memory resources, etc.) associated with performance of specialized, data-free model quantization in accordance with the disclosure. In some implementations, the deployment hardware library 304 can include the information associated with the hardware library 646 drop-down menu of FIG. 6.

Figure 5:
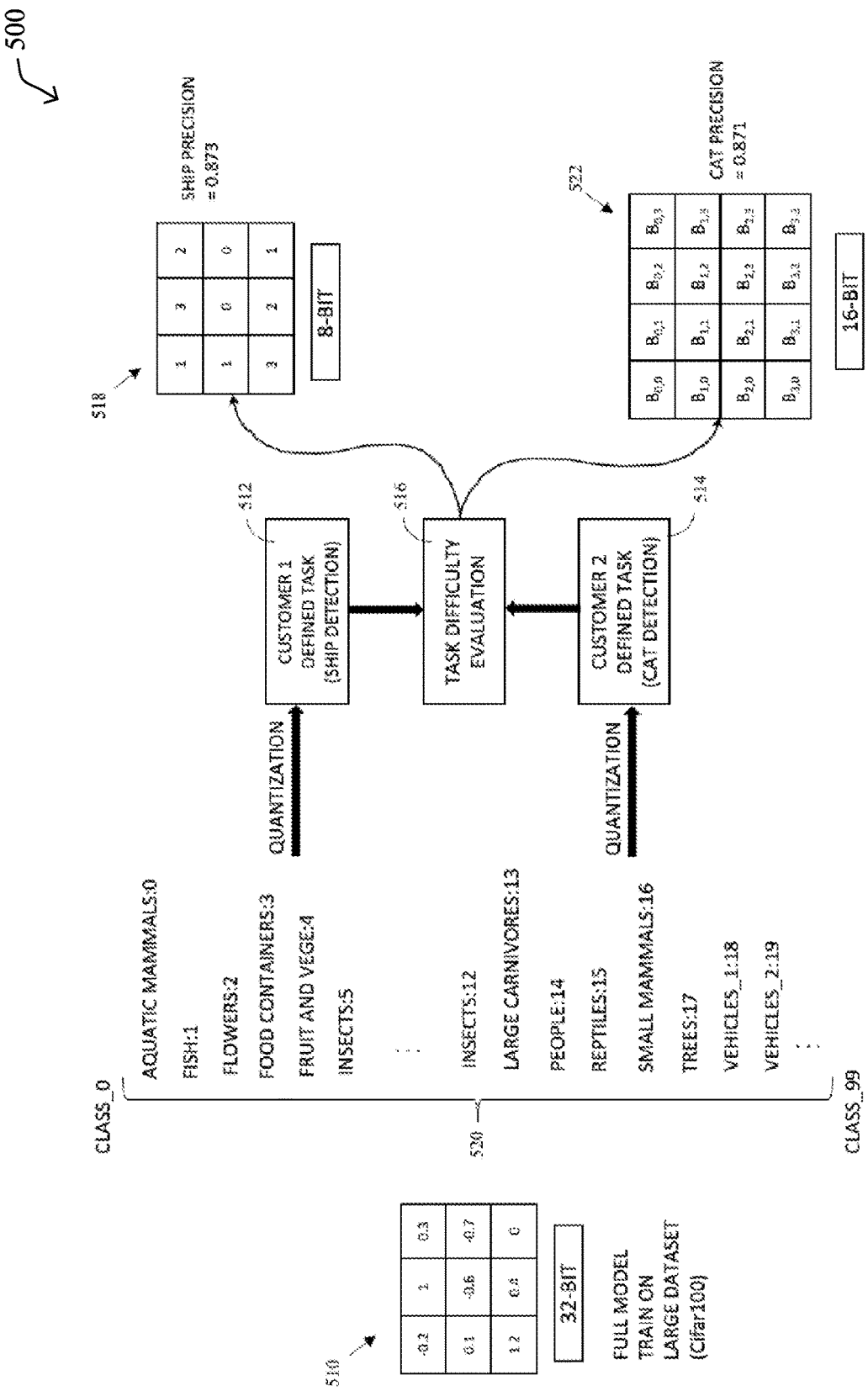
FIG. 5 illustrates an example framework for machine learning model quantization.

The task selector 306 is operable in connection with the user interface 312 to allow a user to specify a task to be performed using the one or more general models and/or one or more specialized models, such as the first specialized model 518 and/or the second specialized model 522 of FIG. 5.

In various implementations, the task difficulty evaluator 308 operates on a class by class (e.g., airplane, cat, person, etc.) basis to rate how difficult it is for the general model to identify each of the possible classes. The task difficulty evaluator 308 can be utilized in connection with the quantization mechanisms described herein, because quantization can also de-create the resultant model's performance/accuracy. For example, in some implementations, the task difficulty evaluator 308 can be configured to perform the task difficulty evaluation 516 described in connection with FIG. 5, herein.

The model generator 310 can be configured to perform quantization and/or specialization tasks on the general model (e.g., the one or more general models stored in the model repository 302), to generate the model 314 to be deployed. In some implementations, the model 314 to be deployed can be analogous to the first specialized model 518 and/or the second specialized model 522 of FIG. 5. In some implementations, constraints used in generating the model 314 can be based on what is specified by the user interface 312, what the deployment system has available for hardware/resources, and how difficult the task is in order to control the level of quantization applied to the model 314.

Further, as shown in FIG. 3, the architecture 300 includes a user interface 312. In some implementations, the user interface 312 can be analogous to the user interface 600 of FIG. 6. Accordingly, the user interface 312 can present visualizations of the model repository 302, the deployment hardware library 304, the task selector 306, the task difficulty evaluator 308, and/or the model generator 310, among other visualizations, to a user. As discussed in more detail in connection with FIG. 6, the user can operate various areas of the user interface 312 and the user interface 312 can display various visualizations to the user in connection with performing specialized, data-free model quantization in accordance with the disclosure.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 4:
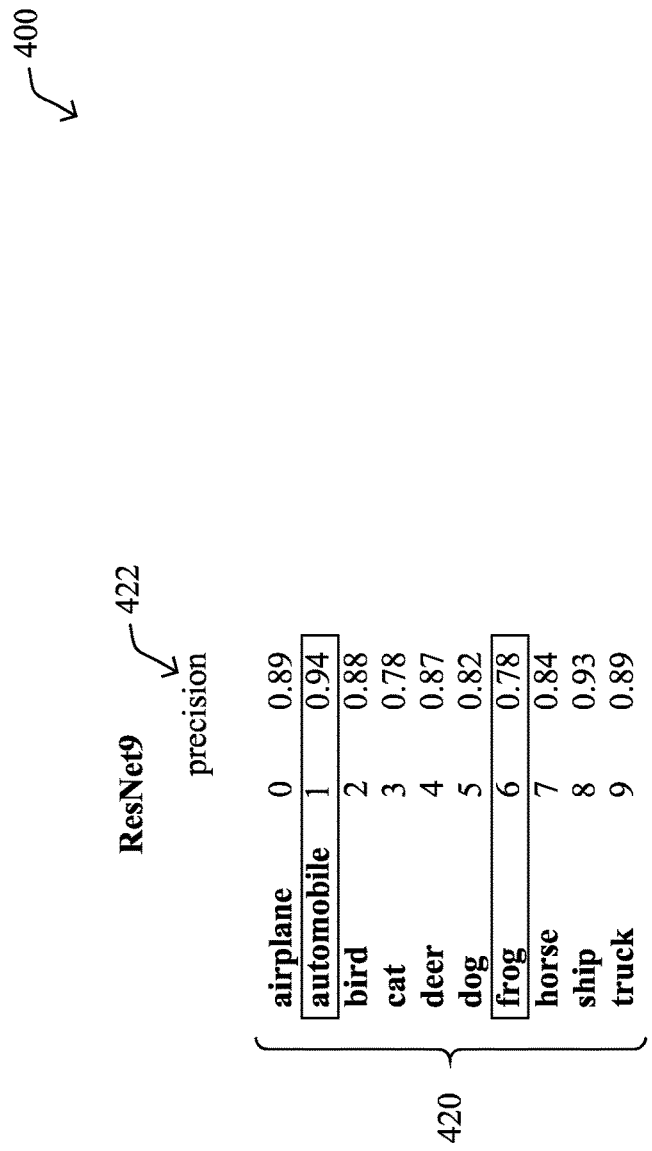
FIG. 4 illustrates an example table of various object classes within a same network architecture.

FIG. 4 illustrates an example table 400 of various object classes 420 within a same network architecture (e.g., the computing system 100). Although the example shown in FIG. 4 corresponds to a ResNet-9 deep convolutional neural network, it will be appreciated that other types of neural networks and machine learning models are contemplated within the scope of the disclosure.

As shown in FIG. 4, the various classes 420 have different levels of difficulty and the precision 422 of the model for each of the classes 420 can vary significantly. For example, as shown in FIG. 4, the class 420 corresponding to an automobile can have a relatively high precision 422 (e.g., a precision of 0.94), while the class 420 corresponding to a frog can have a relatively low precision (e.g., a precision of 0.78). Other classes 420 can each have a respective precision 422 associated therewith as well (e.g., a dog can have a precision 422 of 0.82, a cat can have a precision of 0.78, etc.).

Generally, quantization is an approach to model compression that focuses on reducing the size of the parameters of the model (e.g., a neural network model, machine learning model, etc.). A non-limiting example of reducing the size of the parameters of the model is a reduction of the parameters of the neural network (or machine learning model) from 32 bits to 8 bits. Other non-limiting examples of reducing the size of the parameters of the model could be a reduction of the parameters of the neural network 32 bits to 4 bits, 16 bits to 8 bits, 16 bits to 4 bits, and so on and so forth. It will be appreciated, however, that quantization (e.g., the reduction of the parameters of the model) can also result in varying degrees of model performance. In some implementations, the varying degrees of model performance can occur on a per-class basis, although implementations are not so limited.

As discussed in more detail, herein, aspects of the techniques herein provide a task-aware, specialized, and data-free model quantization framework. As used herein, the term "data-free," particularly in regard to "data-free quantization," generally refers to quantization that is performed in the absence of training datasets and/or validation datasets from the original model. "Data-free quantization" is contrasted with "data-driven quantization," where the quantization is performed using training datasets and/or validation datasets associated with the original model. "Data-free quantization" can allow for quantization of a machine learning model even when the training datasets and/or validation datasets for a given deep learning network are unavailable due to various issues (e.g., privacy, legal requirements, transmission, etc.). In some implementations, a confidence score or user experience parameter is utilized to evaluate the difficulty of classes associated with the model during performance of the quantization operations described herein.

It is noted that several terms d'art are used herein to better elucidate the various implementations of the disclosure. Brief definitions of such terms, as used in connection with the disclosure, are provided below:

Model Specialization generally refers to generating a more specialized model from a base model. For example, model specialization may take the form of providing the ability to label subclasses (e.g., if the base model can detect a 'person' in a video, the specialized model may differentiate between a 'child' and an 'adult' in the video). In some implementations, model specialization may be employed to pare down the class labels that are actually needed for the deployment. For example, if the general model is able to identify boats, airplanes, cars, people, etc. in video, but the deployment is going to be a surveillance system for a crosswalk, model specialization can allow for the deployment model to not identify things such as boats, airplanes, etc., thereby effectively reducing the size of the specialized model in comparison to the base model.

Model Quantization generally refers to the use of compression techniques to reduce the model weights (e.g., from 16-bit down to 8-bit, etc.), to cut down on its resource usage. It will be appreciated that model quantization generally requires a tradeoff with model performance and/or accuracy.

In various implementations, FIG. 5 illustrates an example framework 500 for machine learning model quantization. The framework 500 can be implemented in a computing system, such as the computing system 100 of FIG. 1. In some implementations, the framework 500 is a task-aware, specialized, and data-free model quantization framework 500. The framework 500 can use a confidence score and/or a user experience to evaluate the difficulty of each of the classes 520. That is, because the difficulty associated with evaluating different classes of the classes 520, as described above in connection with FIG. 4, can be different for one or more of the classes 520, the framework 500 can use a confidence score and/or a user experience to evaluate the difficulty of each of the classes 520.

As shown in FIG. 5, a model 510 is generated through model training. In a non-limiting example, the model can be trained on a large dataset, such as a CIFAR-100 dataset. As will be appreciated, the CIFAR-100 dataset consists of sixty thousand (60,000) 32×32 color images in one hundred classes 520, with six hundred (600) images per class. The one hundred classes 520 in the CIFAR-100 are grouped into twenty (20) superclasses. Each image comes with a "fine" label (the class to which it belongs) and a "coarse" label (the superclass to which it belongs). Although FIG. 5 is described in relation to the CIFAR-100 dataset, other datasets (e.g., CIFAR-10, CINIC-100, etc.) can be used in some implementations of the disclosure. For example, in some implementations, the framework 500 can generate a list of models that have different accuracies and/or use different quantities of bits (e.g., 32 bits, 16 bits, 8 bits, 4 bits, etc.).

The specialized model quantization framework 500 can adapt bits of parameters conditioned on different user defined tasks. For example, the framework 500 can adapt a first quantity of bits (e.g., 8 bits) based on a task defined by a first customer (e.g., customer 1 defined task (ship detection) 512) and can adapt a second quantity of bits (e.g., 16 bits) based on a task defined by a second customer (e.g., customer 2 defined task (cat detection) 514). As will be appreciated, the models working on a finer granularity (e.g., a higher quantity of bits) can achieve better accuracy than models working on a coarser granularity (e.g., a lesser quantity of bits). Further, the framework 500 allows for original datasets to be obfuscated, thereby allowing for post-training quantization even when the original datasets are under privacy-sensitive and/or confidential scenarios.

Returning to FIG. 5, assume that the model 510 has been trained on a large dataset to detect a wide range of classes 520 (e.g., ships, trees, people, cats, insects, etc.). From this model 510, the framework 500 can form specialized models (e.g., model 518, model 522, and/or the first compressed model 652 and/or the second compressed model 654 of FIG. 6) that are tailored to the specific use cases and/or specific tasks of different customers. For instance, one customer may want to only detect cats, as shown at 514, while another may want to only detect ships, as shown at 512. By evaluating the difficulty of each of these user-defined tasks at the task difficulty evaluation 516, the framework 500 can select a quantization level that still satisfies one or more other constraints, such as a minimum precision that is needed to identify an object, or other such constraint.

That is, in some implementations, the framework 500 is able to evaluate the quantization level as a constrained optimization problem that takes into account various constraints selected by a user. Non-limiting examples of such constraints can include:

The specific task that is desired and corresponding class(es) associated with said task;

A desired model performance (e.g., a minimum accuracy, minimum precision, etc.);

A desired compression ratio; and/or

The hardware being used for the deployment (a hardware library could be used in this case to identify which quantization levels are supported), among other possibilities.

Subsequent to the task difficulty evaluation 516, a first output model 518 and a second output model 522 are generated. As shown in FIG. 5, the first output model 518 corresponds to the customer 1 defined task (ship detection) 512 and the second output model 522 corresponds to the customer 2 defined task (cat detection) 514. It is noted that the first output model 518 detects or identifies a ship with a precision of 0.873 using 8-bits, while the second output model 522 detects or identifies a cat with a precision of 0.871 using 16-bits.

Figure 6:
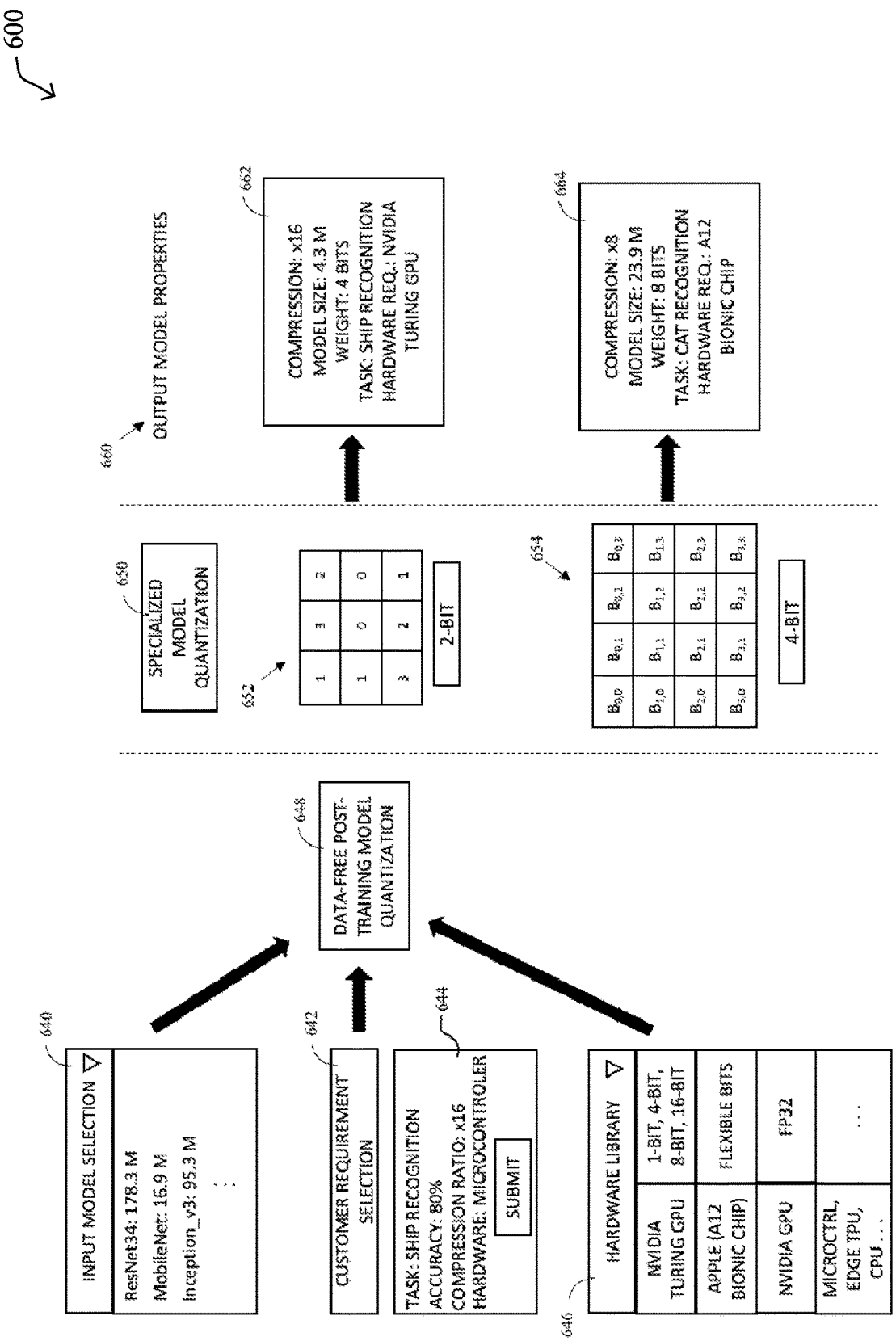
FIG. 6 illustrates an example user interface for specialized, data-free model quantization.

FIG. 6 illustrates an example user interface 600 for specialized, data-free model quantization. In some implementations, the user interface 600 can be used in connection with the framework 500 of FIG. 5 to provide machine learning model quantization in accordance with the disclosure. Further, in some implementations, the user interface 600 can be analogous to the user interface 312 of FIG. 3.

As shown in FIG. 6, the user interface 600 can include various drop-down menus by which a user of the user interface 600 can select various input constraints for machine learning model quantization in accordance with the disclosure. For example, the user interface 600 can include an input model selection 640 drop-down menu, a customer requirement selection 642 drop-down menu, and a hardware library 646 drop-down menu.

In some implementations, the input model selection 640 drop-down menu can allow a user to select input constraints corresponding to a type of input model to use for a machine learning model quantization operation. For example, the input model selection 640 drop-down menu can include various model options, such as ResNet34, MobileNet, and/or Inception_v3, among other model options. In addition, the various model options can have various model sizes associated therewith. In the non-limiting example illustrated in FIG. 6, the trained ResNet34 model can have a size of 178.3 M, the trained MobileNet model can have a size of 16.9 M, and the trained Inception_v3 model can have a size of 95.3 M. It will however be appreciated that other model types and/or model sizes are contemplated within the scope of the disclosure.

In some implementations, the customer requirement selection 642 drop-down menu can include fields 644 that can be configured by a user to specify input constraints related to a customer defined task, such as the customer defined tasks 512 and 514 shown in FIG. 5, herein. In the example shown in FIG. 6, the fields 644 are configured with a task (in this example, "ship recognition"), a desired output accuracy (in this example, 80%), a compression ratio (in this example, ×16), and a type of hardware to use for the machine learning model quantization operation (in this example, a microcontroller). The type of hardware to use for the machine learning model quantization operation can be specified by the user using the hardware library 646 drop-down menu, as discussed below.

As shown in FIG. 6, the user interface 600 further includes a hardware library 646 drop-down menu. In some implementations, the hardware library 646 drop-down menu can allow a user to select input constraints corresponding to a type of hardware to use for a machine learning model quantization operation. For example, the hardware library 646 drop-down menu can include various hardware options, such as an NVIDIA® Turing Graphics Processing Unit (which can be configured by the user to utilized different quantities of bits, such as 1-bit, 4-bits, 8-bits, 16-bits, etc.), and APPLE® A12 bionic chip (which can operate on flexible quantities of bits), an NVIDIA® Graphics Processing Unit (which can operate on 32-bit floating point bit strings, among other possible bit string widths), one or more microcontrollers ("MICROCNTRL"), one or more Edge Tensor Processing Unit(s) ("EDGE TPU"), a Central Processing Unit ("CPU"), and so on and so forth.

Once the user has selected the input constraints using the input model selection 640 drop-down menu, the customer requirement selection 642 drop-down menu, and the hardware library 646 drop-down menu, the user may click on the "SUBMIT" tab on a customer requirement selection 642 drop-down menu, and data-free post-model quantization 648 is performed. In some implementations, one or more processors (e.g., the processor(s) 220 of FIG. 2), a controller (e.g., the controller 320 of FIG. 3), or other hardware device, as selected using the hardware library 646 drop-down menu performs the data-free post-model quantization 648.

As shown in FIG. 6, subsequent to performance of the data-free post-model quantization 648, specialized model quantization 650 may be performed to yield a first compressed model 652, which may be analogous to the first output model 518 of FIG. 5 and/or a second compressed model 654, which may be analogous to the second output model 522 of FIG. 5. It is noted that the first compressed model 652 may have a resolution of 2 bits, while the second compressed model 654 may have a resolution of 4 bits, as shown in FIG. 6, although implementations are not so limited.

In addition, output model properties 660 can be generated and displayed via the user interface 600. For example, as shown in FIG. 6, the user interface 600 can display output model properties 660 for a first quantized output model 662 and/or a second quantized output model 664. In the non-limiting example described herein, the output model properties 660 for the first quantized output model 662 displays properties such as the compression (×16 in this example), the model size (4.3 M in this example), the weight (4 bits in this example), the user defined task (ship detection in this example), and the hardware used for the quantization (NVIDIA® Turing Graphics Processing Unit in this example). Similarly, the output model properties 660 for the second quantized output model 664 displays properties such as the compression (×8 in this example), the model size (23.9 M in this example), the weight (8 bits in this example), the user defined task (cat detection in this example), and the hardware used for the quantization (A12 Bionic Chip in this example).

Finally, it is noted that, in accordance with the disclosure, the framework 500 will specialize the input model to the selected task, as well as quantize it to a level that satisfies the input constraints, resulting in a new, compressed model (e.g., the first compressed model 652 and/or the second compressed model 654) that can be deployed for the task. Since the approaches described herein rely on a large input model and not on its associated training data, this also allow for model generation without exposing the underlying training data and, accordingly, implementations of the disclosure can satisfy any data usage requirements (e.g., privacy, security, etc.) associated with the training data.

Figure 7:
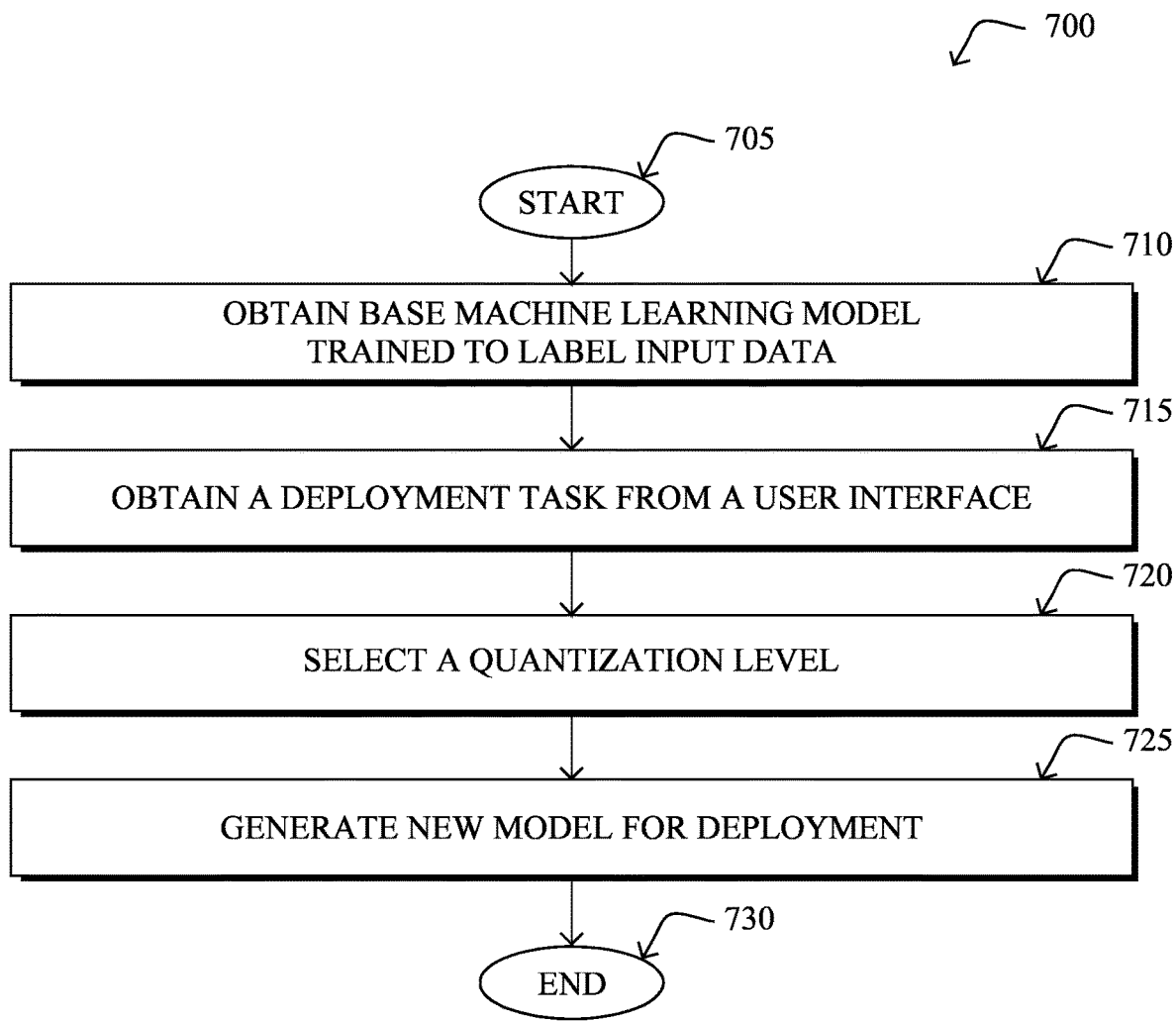
FIG. 7 illustrates an example simplified procedure for specialized, data-free model quantization.

FIG. 7 illustrates an example simplified procedure 700 (e.g., a method) for a specialized, data-free model quantization. For example, a non-generic, specifically configured device for specialized, data-free model quantization (e.g., device 200), may perform procedure 700 by executing stored instructions (e.g., machine learning model quantization process 248). The procedure 700 may start at step 705, and continues to step 710, where, as described in greater detail above, the device (e.g., a controller, processor, etc.) may obtain, a base machine learning model trained to label input data using a plurality of classes. In some implementations, the input data can include video data.

At step 715, as detailed above, the device may receive a deployment task from a user interface indicative of a subset of one or more of the plurality of classes to be identified by a new model for deployment.

At step 720, as detailed above, the device may select a quantization level based on a difficulty associated with the deployment task. In various implementations, the difficulty can be based on an accuracy associated with the base machine learning model for at least one of the plurality of classes. Implementations are not so limited, however, and in some implementations, the difficulty can be based on one or more user confidence scores corresponding to at least one of the plurality of classes.

At step 725, as detailed above, the device may generate the new model for deployment that is quantized from the base machine learning model and specialized to label its input data using only the subset of one or more of the plurality of classes. Information corresponding to the new model can be provided via a user interface. In some implementations, the device may cause the new model to be deployed as part of performing the deployment. Further, in some implementations, the new model for deployment can be generated using a data-free quantization technique.

In various implementations, the device can receive a user input corresponding to a desired minimum performance for the new model. In such implementations, the device can generate the new model based on the user input corresponding to the desired minimum performance for the new model. Implementations are not so limited, however, and in some implementations, the device can receive a user input corresponding to a desired compression ratio for the new model and generate the new model based on the user input corresponding to the desired compression ratio for the new model. In yet other implementations, the device can receive a user input corresponding to hardware characteristics of a computing environment in which the new model is to be deployed and generate the new model based on the user input corresponding to the computing environment in which the new model is to be deployed.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, provide for machine learning model quantization. More specifically, by providing a user with the ability to produce compressed machine learning models that are specialized and compressed through quantization in an automated and optimized way allows for resources in a computing system to be provided such the resources are neither over-provisioned nor under-provisioned while providing object recognition with a desired level of precision.

While there have been shown and described illustrative implementations that provide for machine learning model quantization, it is to be understood that various other adaptations and modifications may be made within the spirit and scope of the implementations herein. For example, while certain implementations are described herein with respect to machine learning workloads directed towards model training, the techniques herein are not limited as such and may be used for other types of machine learning tasks, such as making inferences or predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method comprising:
   obtaining, by a device, a base machine learning model trained to label input data using a plurality of classes;
   receiving, at the device, a deployment task from a user interface indicative of a subset of one or more of the plurality of classes to be identified by a new model for deployment;
   selecting, by the device, a quantization level based on a difficulty associated with the deployment task; and
   generating, by the device, the new model for deployment that is quantized from the base machine learning model and specialized to label its input data using only the subset of one or more of the plurality of classes.

2. The method of claim 1, further comprising causing, by the device, the new model to be deployed as part of performing the deployment.

3. The method of claim 1, wherein the difficulty is based on an accuracy associated with the base machine learning model for at least one of the plurality of classes.

4. The method of claim 1, wherein the difficulty is based on one or more user confidence scores corresponding to at least one of the plurality of classes.

5. The method of claim 1, further comprising:
   receiving, by the device, a user input corresponding to a desired minimum performance for the new model; and
   generating, by the device, the new model based on the user input corresponding to the desired minimum performance for the new model.

6. The method of claim 1, further comprising:
   receiving, by the device, a user input corresponding to a desired compression ratio for the new model; and
   generating, by the device, the new model based on the user input corresponding to the desired compression ratio for the new model.

7. The method of claim 1, further comprising:
   receiving, by the device, a user input corresponding to hardware characteristics of a computing environment in which the new model is to be deployed; and
   generating, by the device, the new model based on the user input corresponding to the computing environment in which the new model is to be deployed.

8. The method of claim 1, further comprising generating the new model for deployment using a data-free quantization technique.

9. The method of claim 1, further comprising providing, via a user interface, information corresponding to the new model.

10. The method of claim 1, wherein the input data includes video data.

11. An apparatus, comprising:
   one or more network interfaces to communicate with a network;
     a processor coupled to the one or more network interfaces and configured to execute one or more processes; and
     a memory configured to store a process that is executable by the processor, the process, when executed, configured to:
   obtain a base machine learning model trained to label input data using a plurality of classes;
   receive a deployment task from a user interface indicative of a subset of one or more of the plurality of classes to be identified by a new model for deployment;
   select a quantization level based on a difficulty associated with the deployment task; and
   generate the new model for deployment that is quantized from the base machine learning model and specialized to label its input data using only the subset of one or more of the plurality of classes.

12. The apparatus of claim 11, wherein the process, when executed, is configured to cause the new model to be deployed as part of performing the deployment.

13. The apparatus of claim 11, wherein the difficulty is based on an accuracy associated with the base machine learning model for at least one of the plurality of classes.

14. The apparatus of claim 11, wherein the difficulty is based on one or more user confidence scores corresponding to at least one of the plurality of classes.

15. The apparatus of claim 11, wherein the process, when executed, is configured to:
   receive a user input corresponding to a desired minimum performance for the new model; and
   generate the new model based on the user input corresponding to the desired minimum performance for the new model.

16. The apparatus of claim 11, wherein the process, when executed, is configured to:
   receive a user input corresponding to a desired compression ratio for the new model; and
   generate the new model based on the user input corresponding to the desired compression ratio for the new model.

17. The apparatus of claim 11, wherein the process, when executed, is configured to:
- receive a user input corresponding to hardware characteristics of a computing environment in which the new model is to be deployed; and
- generate the new model based on the user input corresponding to the computing environment in which the new model is to be deployed.

18. The apparatus of claim 11, wherein the process, when executed, is configured to generate the new model for deployment using a data-free quantization technique.

19. The apparatus of claim 11, wherein the process, when executed, is configured to provide, via a user interface, information corresponding to the new model.

20. A tangible, non-transitory, computer-readable medium storing program instructions that cause a device to execute a process comprising:
- obtaining, by the device, a base machine learning model trained to label input data using a plurality of classes;
- receiving, at the device, a deployment task from a user interface indicative of a subset of one or more of the plurality of classes to be identified by a new model for deployment;
- selecting, by the device, a quantization level based on a difficulty associated with the deployment task; and
- generating, by the device, the new model for deployment that is quantized from the base machine learning model and specialized to label its input data using only the subset of one or more of the plurality of classes.

\* \* \* \* \*